(12) United States Patent
Corallo et al.

(10) Patent No.: US 6,222,628 B1
(45) Date of Patent: Apr. 24, 2001

(54) SURFACE CHARACTERISTICS MEASUREMENT SYSTEM AND METHOD

(75) Inventors: Valeriano Corallo, Turin; Franco Docchio, Bergamo; Umberto Minoni; Emidio Zorzella, both of Gussago, all of (IT)

(73) Assignee: Techint Compagnia Tecnica Internazionale S.p.A. (IT)

( * ) Notice: Subject to any disclaimer, the term of this patent is extended or adjusted under 35 U.S.C. 154(b) by 0 days.

(21) Appl. No.: 09/295,304

(22) Filed: Apr. 21, 1999

(30) Foreign Application Priority Data

Jun. 10, 1998 (IT) .................................................. 98A2145

(51) Int. Cl.[7] .................................................. G01B 11/30
(52) U.S. Cl. .......................................................... 356/371
(58) Field of Search .................................. 356/371, 376, 356/445, 446

(56) References Cited

U.S. PATENT DOCUMENTS

| | | |
|---|---|---|
| 3,771,880 | 11/1973 | Bennett . |
| 4,334,780 | 6/1982 | Pernick . |
| 4,364,663 | 12/1982 | Gardner et al. . |
| 4,770,536 * | 9/1988 | Goberstein ........................... 356/271 |
| 4,803,374 | 2/1989 | Monfort et al. . |
| 4,916,824 | 4/1990 | Shimazutsu et al. . |
| 4,972,092 | 11/1990 | Schmitt et al. . |
| 4,973,164 | 11/1990 | Weber et al. . |
| 4,978,861 * | 12/1990 | Sabater et al. ....................... 356/371 |
| 4,989,984 * | 2/1991 | Salinger ................................ 356/445 |
| 5,410,410 | 4/1995 | Yamazaki et al. . |
| 5,608,527 | 3/1997 | Valliant et al. ....................... 356/371 |
| 5,617,645 | 4/1997 | Wick et al. . |
| 5,661,556 | 8/1997 | Schiff et al. . |
| 5,757,496 | 5/1998 | Yamazaki . |
| 5,778,551 | 7/1998 | Herklotz et al. . |
| 5,831,940 * | 11/1998 | Terauchi .............................. 356/402 |
| 5,877,858 * | 3/1999 | Kerstens et al. ..................... 356/371 |

* cited by examiner

Primary Examiner—Richard A. Rosenberger
(74) Attorney, Agent, or Firm—Nixon Peabody LLP; Charles M. Leedom, Jr.; Daniel S. Song

(57) ABSTRACT

An improved surface characteristic measurement system for measuring a characteristic of a surface comprising a processor, a light source for providing a light beam on the surface to be measured, a position sensing device for sensing a position of a diffused light diffused by the surface, and a photodiode for sensing intensity of a reflected light reflected by the surface. The position sensing device, which may be a PIN diode, provides a position signal to the processor indicative of position of the diffused light while the photodiode provides a reflected light intensity signal to the processor indicative of reflected light intensity. The processor determines the surface characteristic based at least one of the position signal and the reflected light intensity signal. In one embodiment, the position sensing device also provides a diffused light intensity signal to the processor indicative of intensity of the diffused light and the processor determines the surface characteristic based on at least two of these signals. In yet another embodiment, the position sensing device determines the surface characteristic based on all three signals. In other embodiments, the measurement system also includes a second photodiode and a second position sensing device. In alternative embodiments, the photodiode may include a circular sensing area with a centrally positioned opening for allowing passage of the light beam from the light source. Alternatively, the photodiode may have a hemi-spherically shaped sensing area with a centrally positioned opening for allowing passage of the light beam from the light source.

41 Claims, 4 Drawing Sheets

SURFACE CHARACTERISTICS MEASUREMENT SYSTEM AND METHOD

BACKGROUND OF THE INVENTION

1. Field of the Invention

The present invention is related to the field of surface measurements and metrology. More specifically, the invention relates to optical devices for optically measuring characteristics of a surface such as roughness, waviness and/or form error.

2. Description of Related Art

The global economy and the ever increasing demands of competition has led to ever increasing quality of manufactured products. In this quest for quality, manufacturing methods and machines have been created to attain the engineering requirements specified in these products. As manufacturers seek to produce products with more desirable surface characteristics and to tightly control quality of these surfaces, technology related to the field of surface characteristics measurement and metrology have continued to develop and evolve. For example, in the metal processing industry, the measurement of surface characteristics is critical in determining the quality of ground or rolled metal products. In addition, surface characteristics measurement must be made on the mills, rollers, molds and other processing equipment which are used to manufacture metal products in order to ensure that the quality of the products meet or exceed the engineering design specifications. Of course, surface characteristics measurement is critical in many other industries in addition to the metal processing industry such as plastics, textiles, paper, composites, silicon processing and glass industries to name a few.

Various surface characteristics may be described and quantified to describe the physical attributes of any given surface. Such characteristics of particular interest include surface roughness, waviness and form error which are all currently measured and monitored in the above noted industries as well as others. These three surface characteristics all describe the irregularities which are present in all surfaces. These surface characteristics are related terms of art and are differentiated primarily by the wavelength and the amplitude of a particular irregularity such as a peak or a valley on the surface. In this regard, a reference parameter "G", has been established in order to allow this differentiation. The reference parameter G is defined as the ratio between the amplitude of the irregularity and one wavelength of the irregularity (i.e. distance between consecutive irregularities). Thus, surface roughness is generally characterized by $0.01<G<0.2$; waviness is generally characterized in that $0.001<G<0.01$; and form error is generally characterized in that $G<0.001$. In absolute numeric terms, surface roughness in metals and metal manufacturing is generally considered to have a wavelength $\lambda<500$ $\mu$m. In these industries, waviness is generally considered to have a wavelength $\lambda$ between 500 $\mu$m and 1 cm whereas form error generally has a wavelength $\lambda>1$ cm. As described, it should be understood that these three surface characteristics are differentiated primarily by the size of the wavelength. Thus, the above cited measurements are general ranges only and may differ between applications and various industries.

Surface roughness has been of particular interest to various industries including the steel and machine industries. In these industries, the surface roughness is quantified by measuring an "Ra" value which is defined as the arithmetical average profile deviation of the surface irregularities with respect to a hypothetical perfect surface established by an arithmetical averaged line. Because of the importance in obtaining accurate surface roughness measurements, many devices have been developed to measure the Ra values of a surface. For instance, mechanical devices have been developed including profilometers that have a probe such as a stylus which is brought in contact with the surface of the object being measured. The stylus is then horizontally moved across the surface for a predetermined distance. During this horizontal movement, the stylus is moved in a vertical direction following the peaks and valleys of the irregularities on the surface thereby providing a profile of the surface being measured. This vertical displacement generates an electrical signal which may then be used with the known horizontal displacement to determine the surface roughness. Such profilometers are known in the art and is generally described in U.S. Pat. No. 5,778,551 to Herklotz et al.

Although these profilometers have gained substantial popularity in industry, there are several disadvantages which limit their applicability. These disadvantages include the fact that the object being measured must be physically contacted by the probe in order to obtain the roughness measurement. This contact can cause scratches and additional irregularities on the surface being measured. Other disadvantages include limitations on accuracy and repeatability since the probes have a physical dimension and will alter the surface as it is moved across the measured surface. In addition, the profilometer is not practical for use in many manufacturing settings such as in a production line because the object to be measured must be stopped and the measurement process itself takes a relatively long time. Furthermore, many manufacturing environments are subject to vibrations which can render the profilometer measurements inaccurate and useless. For these reasons, profilometers are commonly used in laboratory environments and have not been effectively implemented in manufacturing environments.

Optical devices which allow non-contact measurement of surfaces have been developed in order to avoid the above noted disadvantages of mechanical designs. These optical devices detect the image of an illuminated point such as those created by a laser beam on the surface to be measured. Two categories of such optical devices known and used in industry are light scattering systems and triangulation systems.

The light scattering systems measure a surface characteristic by measuring the amount of a light beam scattered by the surface; or conversely, by measuring the intensity of light beam not scattered by the surface. Such light scattering systems generally operate by deflecting a laser beam at a predetermined angle off the surface to be measured. This deflected laser beam is somewhat scattered by the surface irregularities thereby creating a diffused field where the light is deflected in various directions depending upon the surface irregularities. This scattering of the laser beam correspondingly decreases the intensity of the deflected specular beam. The deflected specular beam is then directed on to a photodiode which generates a signal in proportion to the intensity of the deflected specular beam. Since the intensity of the light beam initially emitted by the laser is known, the desired surface characteristic can be determined by processing the signal from the photodiode. More specifically, the signal which corresponds to the intensity of the deflected specular beam (or conversely, the reduction of the initial laser beam) may be correlated with known surface characteristics such as roughness. In other systems, the diffused fields of the laser beam may be detected by photodetectors to provide a signal corresponding to the intensity of these fields in order to determine surface characteristics. Such light scattering systems are illustrated and discussed in U.S. Pat. No. 3,771,880 to Bennett, U.S. Pat. No. 4,364,663 to Gardner et al. and U.S. Pat. No. 5,608,527 to Valliant et al. Another related light scattering system is disclosed in U.S. Pat. No. 5,661,556 to Schiff et al. which utilizes a hollow sphere to measure the total laser light scattered on a surface to determine the correlated roughness of the surface.

In contrast to the light scattering systems described above, the triangulation systems measure surface characteristics by detecting a position of diffused light on a position sensing device (PSD). More specifically, such triangulation systems operate by focusing a laser beam on a point at a predetermined work distance directly over the surface to be measured. A diffused light of the laser beam which is diffused by the surface being measured is focused on to a PSD such as a PIN diode that is sensitive to the position of the diffused light. The PIN diode produces an output signal indicative of the position of the diffused light. When the focused laser beam is over a surface irregularity such as a peak or a valley, the position of the diffused light focused on the PIN diode changes thereby changing the output signal provided by the PIN diode. The desired surface characteristic may then be measured based on the change in the output signal which is proportional to the deflection of the diffused light, which in turn, is geometrically correlated to the shape and size of the irregularity on the surface being measured. Such triangulation systems are illustrated and discussed in U.S. Pat. No. 5,617,645 to Wick et al. Other triangulation measurement systems utilize a plurality of photodiodes to obtain more accurate surface characteristic measurements. Such systems are disclosed in U.S. Pat. No. 4,973,164 to Weber et al.

Both the light scattering and the triangulation systems of the type discussed above have been found to be particularly useful in manufacturing applications because measurements do not require a probe that physically contacts the object to be measured. An added advantage is that the measurements may be made quickly (e.g. 500 measurements/minute) without interrupting or stopping the manufacturing process. However, disadvantages to these systems have also been found which limit their utility and applicability.

Initially, with respect to the light scattering systems, limitations in efficiency and precision in medium and high roughness ranges have been found. In these systems, testing has revealed that the measurement range is limited by the wavelength and the power of the laser source. As the roughness of the surface increases, the amount of light scattered also increases thereby substantially decreasing the amount of light received by the photodiode which, correspondingly, results in the decrease of the resolution and accuracy of the measurements. In order to compensate for the additional scatter, higher power lasers would have to be used. However, use of such higher power lasers may be strictly regulated or prohibited in some cases and such high power lasers are expensive making it an unviable option in most industrial applications. In addition, because of the intensity of the light beam, such high powered lasers may, in fact, alter the surface of the object being measured. Thus, studies have found that current light scattering systems using conventional, commercially available lasers are not accurate beyond an approximate Ra value of 0.4 $\mu$m. In addition, such light scattering systems cannot provide accurate information regarding surface waviness and form error which have much longer wavelength $\lambda$ than surface roughness. In those light scattering systems that measure total diffused light with spheres, limitations have been found with respect to their effectiveness because of the difficulties associated with preventing stray light from entering the hollow sphere, containing all the light within the sphere and the restrictive physical dimensioning of the sphere and its components.

With respect to triangulation systems, it has been found that such systems are effective in measuring surface characteristics with larger wavelengths $\lambda$ such as waviness and form error. However, it has been found that these triangulation systems and the current PIN photodiode technology does not provide adequate resolution to effectively measure surface roughness except for very high roughness such as when Ra>5 $\mu$m. Hence, whereas triangulation systems are very useful in providing various surface characteristics such as waviness, form error and to a lesser extent, very high roughness, these systems have been found to be inadequate where higher resolution is required such as during roughness measurements of very smooth surfaces having a low Ra value.

Thus, because the currently known systems measure surface characteristics through either the light scattering or the triangulation techniques discussed above, they do not provide accurate measurements with respect to all of the surface characteristics including surface roughness, waviness and form error. In addition, these current systems do not provide sufficiently accurate surface roughness measurements of Ra between 0.4 $\mu$m and 5 $\mu$m and more specifically, fail to give accurate measurements with respect to surface roughness ranging between 0.4 $\mu$m to 1.4 $\mu$m which is the range of surface roughness commonly used in metal manufacturing and processing industries.

Furthermore, it has been found that many of currently available light scattering and triangulation systems require precise positioning and alignment relative to the surface being measured in order to yield accurate results. However, such precise positioning and alignment is often difficult to attain, especially in manufacturing environments where vibrations occur. Consequently, it has also been found that these systems are susceptible to misalignment errors and inaccuracies, especially in the manufacturing environments where such non-contact measurement systems would be most useful.

Therefore, there exists a need for an improved surface characteristics measurement system that can be used in a manufacturing environment and provide accurate surface characteristics measurements, especially with respect to surface roughness, waviness and form error. There also exists a need for an improved surface characteristics measurement system that can provide accurate surface roughness measurements of Ra between 0.4 $\mu$m and 1.4 $\mu$m. In addition, there exists a need for an improved surface characteristics measurement system which is not as susceptible to misalignment errors as the currently available systems. Furthermore, there also exists a need for a method for effectively obtaining these measurements.

SUMMARY OF THE INVENTION

In view of the foregoing, it is an object of the present invention to provide an improved surface characteristics measurement system for non-contact measurement of a surface that can be effectively used in a manufacturing environment.

A second object of the present invention is to provide an improved surface characteristics measurement system which will overcome the limitations and disadvantages of the prior art measurement systems by providing accurate measurements of various surface characteristics.

Yet another object of the present invention is to provide an improved surface characteristic measurement system which can accurately measure surface roughness, waviness and form error.

A fourth object of the present invention is to provide an improved surface characteristic measurement system which is less susceptible to misalignment errors.

Still, another object of the present invention is to provide a method for effectively obtaining such surface characteristic measurements.

In accordance with the embodiments of the present invention, these objects are obtained by an improved surface characteristics measurement system for measuring a characteristics of a surface comprising a processor, a light source for providing a light beam on the surface to be measured, a position sensing device for sensing a position of a diffused light diffused by the surface, and a photodiode for sensing intensity of a reflected light reflected by the surface. The position sensing device, which may be a PIN diode, provides a position signal to the processor indicative of the position of the diffused light while the photodiode provides a reflected light intensity signal to the processor indicative of reflected light intensity. In this embodiment, the processor determines the surface characteristics based at least one of the position signal and the reflected light intensity signal. In another embodiment, the position sensing device also provides a diffused light intensity signal to the processor indicative of the diffused light intensity and the processor determines the surface characteristics based on at least two of the position signal, the reflected light intensity signal and the diffused light intensity signal. In yet another embodiment, the position sensing device determines the surface characteristics based on all three signals including the position signal, the reflected light intensity signal and the diffused light intensity signal. In other embodiments, the measurement system also includes a second position sensing device and/or a second photodiode to enhance the sensing of the diffused light and/or the reflected light. In alternative embodiments, a single photodiode may be used which has a circular sensing area with a centrally positioned opening for allowing passage of the light beam from the light source. In this embodiment, the single photodiode may be mounted on a printed circuit type board. Alternatively, in yet another embodiment, the photodiode may have a hemi-spherically shaped sensing area with a centrally positioned opening for allowing passage of the light beam from the light source.

Furthermore, in accordance with the embodiments of the present invention, the above noted objects are also obtained by an improved method for measuring characteristics of a surface comprising the steps of positioning a non-contact, surface measurement sensor at a predetermined distance from the surface to be measured, activating a light source to provide a light beam on the surface, then measuring a position of diffused light using a position sensing device and providing a position signal indicative of the position of the diffused light, measuring an intensity of a reflected light using a photodiode and providing a reflected light intensity signal indicative of the reflected light intensity, and determining the surface characteristics based on at least one of the position signal and the reflected light intensity signal. In an alternative embodiment, the improved method also includes the steps of providing a diffused light intensity signal indicative of the diffused light intensity, and determining the surface characteristics based on at least two of the position signal, the reflected light intensity signal, and the diffused light intensity signal. In yet another alternative embodiment, the surface characteristics are determined based on all three signals including the position signal, the reflected light intensity signal, and the diffused light intensity signal. The present method may also comprise the step of determining a profile measurement through optical triangulation based on the position signal. This profile measurement may be provided to a low-pass filter to determine a waviness value and a form error value indicative of the waviness and form error characteristics of the surface respectively by performing Fourier's analysis on the profile measurement. The profile measurement may also be provided to a high-pass filter for calculating an Ra' value indicative of measured surface roughness of the surface and calculating an Ra value indicative of the calculated surface roughness of the surface by compensating the Ra' value with the reflected light intensity signal and the diffused light intensity signal.

These and other objects, features and advantages of the present invention will become more apparent from the following detailed description of the preferred embodiments of the invention when viewed in conjunction with the accompanying drawings.

DETAILED DESCRIPTION OF THE PREFERRED EMBODIMENTS

Figure 1:
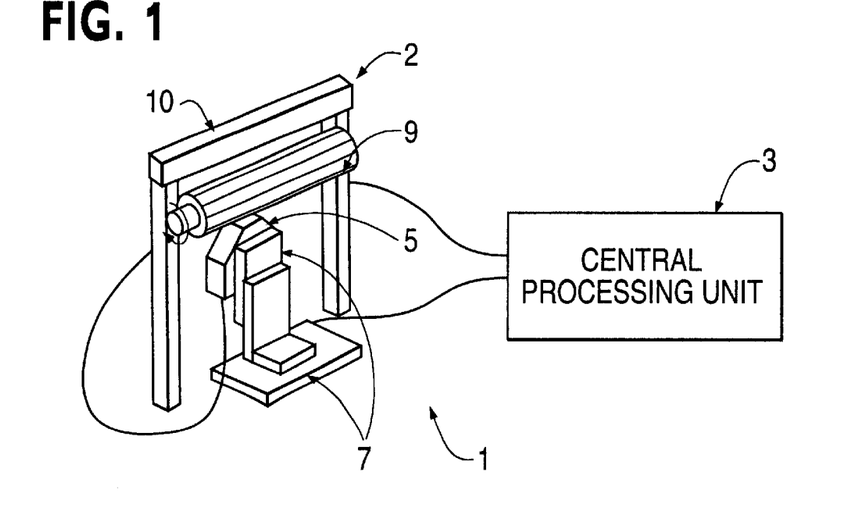
FIG. 1 is a panoramic view of a surface characteristics measurement system in accordance with the present invention.

FIG. 1 illustrates a surface characteristics measurement system for measuring at least one characteristic of a surface in accordance with one embodiment of the present invention. As discussed hereinbelow, the present invention provides a surface characteristics measurement system which can be effectively used in manufacturing environments to provide accurate measurements with respect to surface roughness, waviness, and/or form error. Of course, it should be understood that the embodiments as shown in the various figures and discussed in detail below are only illustrative of the preferred embodiments of the present invention. Consequently, these embodiments may be modified or changed to practice the present invention in alternative embodiments.

In FIG. 1, the surface characteristic measurement system 1 is illustrated mounted on a stand 2 which may be used to measure surface 9. The surface characteristics measurement system 1 includes a processor 3 which is illustrated as a central processing unit in the present embodiment, and also includes a surface measurement sensor 5 which will be discussed in further detail hereinbelow. Various other components of the test stand 2 are shown in FIG. 1 for illustrative purposes only including slides 7 which allow proper positioning of the surface measurement sensor 5 relative to surface 9. The slides 7 may be actuated by servo-motors (not shown) or the like and be automatically controlled by the processor 3 or in an alternative manner known in the art such as through numeric control. It should also be noted that in the present example, the surface to be measured 9 is illustrated as being provided on a rotatable test drum which is in turn, mounted on mounting bracket 10. However, as can be appreciated by one skilled in the art, the present surface characteristics measurement system 1 may be mounted in accordance with the specific application and environment in which the measurement system is used. Thus, the surface characteristics measurement system 1 may be mounted on various manufacturing machineries such as roll mills, stamping machines, molds and quality test stands as well as other machineries where measurement of surface characteristics would be desirable. Of course, as previously noted, surface characteristics are critical in many other industries in addition to metal processing industries. Thus, the present invention may also be effectively implemented in other industries including plastics, textiles, paper, composites, silicon processing and glass industries to name a few.

Figure 2:
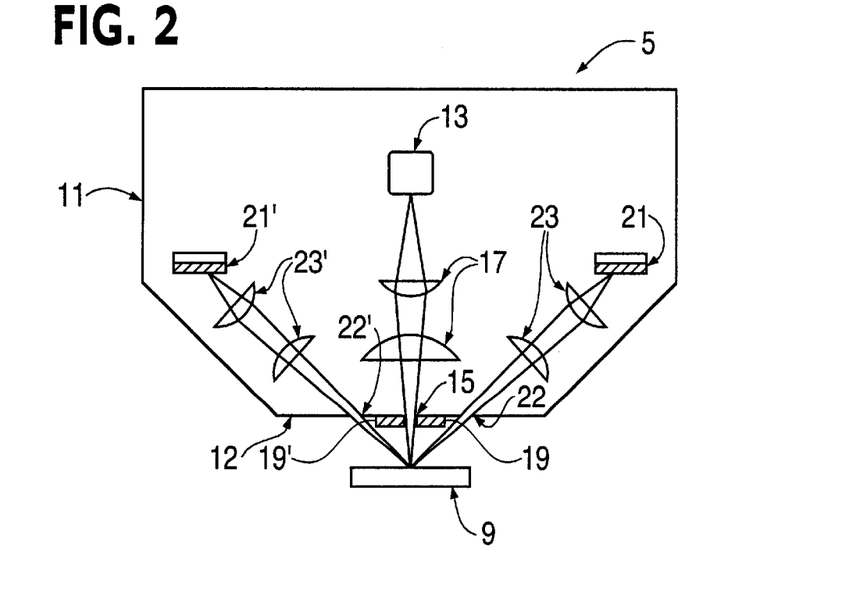
FIG. 2 is a cross-sectional view of a surface measurement sensor in accordance with the present invention.

One embodiment of the surface measurement sensor 5 is illustrated in detail in FIG. 2. As clearly shown, the surface measurement sensor 5 includes a housing 11 which encases the various components of the sensor. Mounted within the sensor housing 11 is a light source 13 for providing a light beam onto the surface 9 that is substantially perpendicular to the surface 9. The light source 13 may be a laser, a light emitting diode (LED), or any other light source suited for providing a beam of light onto surface 9. In the preferred embodiment, a 35 mW laser having a wavelength of 780 nm (class IIIb) has been found to provide an effective light beam which may be used to measure the desired surface characteristics. In the preferred embodiment, a first opening 15 is provided on the front face 12 of the housing 11 in order to allow the light beam to be provided on surface 9. Furthermore, the light beam provided by the light source 13 may be conditioned through various optical elements 17 within the housing that improve the focus of the light beam on the surface 9. These optical elements 17 may comprise optical lenses appropriately designed and manufactured as known in the optics arts, the details of which are not presented here.

Figure 3:
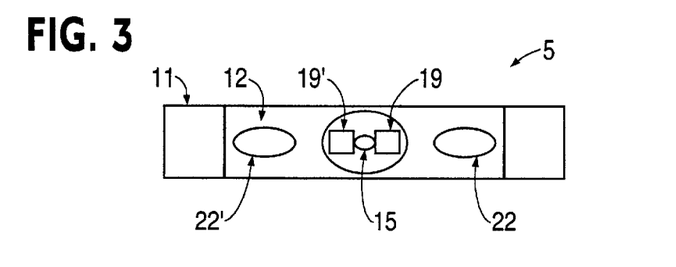
FIG. 3 is a frontal view of the face of the surface measurement sensor of FIG. 1.

Referring to FIGS. 2 and 3, the surface measurement sensor 5 also includes a position sensing device 21 (PSD) for sensing the position of diffused light focused on the position sensing device 21. The diffused light is generally understood in the art as light that is reflected off the surface 9 at large angles from a specular beam. In this regard, the front face 12 of the housing 11 may also include a second opening 22 which allows the diffused light from the surface 9 to enter the surface measurement sensor 5 and illuminate upon the position sensing device 21. The position sensing device 21 provides a position signal to the processor 3 indicative of the position of the diffused light which will be processed by the processor 3 to obtain surface characteristics as will be described later. The position signal may also be conditioned through a transimpedance amplifier (not shown) prior to providing the position signal to the processor 3. The surface measurement sensor 5 may also include secondary optical elements 23 that focus the diffused light onto the position sensing device 21. In addition, in the illustrated embodiment, a second position sensing device 21' may also be provided, together with secondary optical elements 23' and a second opening 22'. The second position sensing device 21' allows more of the diffused light to be sensed and allows the position signal and the diffused light intensity signal to be more accurate, which in turn, result in more accurate surface characteristics measurements. Furthermore, the second position sensing device 21' reduces the sensor's 5 susceptibility to misalignment errors since the diffused light can be sensed by both, or either, of the two position sensing devices. In regard to the above described surface measurement sensor 5, the LTS model sensor manufactured by Dynavision® has been found to provide an effective turn-key assembly for providing the light source 13 in a housing with the position sensing devices 21 and 21' properly located to sense the diffused light.

While the above described features of the surface measurement sensor 5 is known in the prior art, the surface measurement sensor 5 in accordance with the present invention further includes additional features that allows the surface measurement sensor 5 to effectively and accurately measure various surface characteristics including surface roughness, waviness, and form error. In this regard, the position sensing device 21 in accordance with one embodiment of the present invention may be a PIN diode that also provides a diffused light intensity signal to processor 3 indicative of the intensity of the diffused light. In addition, the diffused light intensity signal may also be conditioned through a transimpedance amplifier (not shown) prior to providing the signal to the processor 3. Moreover, the surface measurement sensor 5 in accordance with the present invention also includes a photodiode 19 for sensing light reflected by the surface 9 which is not known or taught in the prior art. The photodiode 19 provides a reflected light intensity signal to the processor 3 which is indicative of the reflected light intensity. As clearly shown in the illustrated embodiment of FIG. 2, a second photodiode 19' may also be provided to sense light reflected by the surface 9. This second photodiode 19' allows improved accuracy in the measurement of the surface characteristics and reduces the sensor's 5 susceptibility to misalignment errors since the intensity of the reflected light can be sensed by both, or either, of the two photodiodes. It should also be noted that because the light source 13 provides a light beam substantially perpendicular to the surface 9, the photodiodes 19 and 19' of the illustrated embodiment generally do not sense the intensity of a specular light beam. The specular light beam is generally understood in the art as the light which is directly reflected off the surface such that the directions of the incident and the reflected specular light beam make equal angles with a line perpendicular to the reflecting surface. Thus, in the illustrated embodiment, the photodiodes 19 and 19' receive light in the reflected field around the specular light beam. The reflected field is generally understood in the art as light that is reflected off the surface 9 at a very small angle from the specular light beam. This reflected field has been found by the present applicants to contain sufficient information regarding the surface 9 such that it may be used to effectively determine various surface characteristics of the surface 9 in the manner described later. For example, photodiodes from Siemens® such as their model BPW34F may be used to effectively provide the desired sensitivity and output in accordance with the present invention. Of course, other photodiodes from other manufacturers may also be used also in accordance with the present invention and the surface measurement sensor 5 may be modified such that the photodiode 19 measures the intensity of the specular light beam and this specular light is used as the light in the reflected field to provide surface characteristics measurements described below. In addition, like the prior signals, the reflected light intensity signal may also be conditioned through a transimpedance amplifier (not shown) prior to providing the signal to the processor 3.

The relative positioning of various components of the surface measurement sensor 5 is illustrated in FIG. 3 as seen from the front face 12 of the housing 11. As can be seen, the first opening 15 is located between the two photodiodes 19 and 19' to allow the photodiodes 19 and 19' to accurately sense the intensity of the reflected light. The secondary openings 22 and 22' are illustrated as being elliptical since the position sensing devices 21 and 21' are positioned within the surface measurement sensor 5 at an angle of approximately 45 degrees from the light beam provided by the light source 13. As noted previously, the LTS sensor manufactured by Dynavision® has been found to provide an effective turn-key assembly by which the surface measurement sensor 5 in accordance with the present invention may be made. Again, it should be noted that the positioning of the various components may be modified depending on the specific application of the surface measurement sensor 5 and the components used therein.

In operation, the present embodiment of the surface characteristics measurement system 1 utilizes the light source 13, the position sensing devices 21 and 21', and the photodiodes 19 and 19', to determine the surface characteristics such as surface roughness, waviness and form error. Initially, the surface measurement sensor 5 is positioned at a predetermined distance from the surface 9. As previously noted, this may be accomplished by utilizing slides 7 which are controlled by processor 3. The position and the predetermined distance depends on the area of the surface 9 to be measured, the condition of the surface 9, as well as the specifics of the surface measurement sensor 5 such as the focal distances of the various components including optical elements 17 and secondary optical elements 23. In this regard, a secondary light source (not shown) such as a light emitting diode may also be provided within the surface measurement sensor 5 to provide a visual light beam on the measured surface 9 in order to visually show the positioning of the surface measurement sensor 5 and to facilitate the positioning process. Once the surface measurement sensor 5 is properly positioned over the surface 9 to be measured, the light source 13 such as a laser is activated to provide a light beam on the surface 9.

When the light beam reaches surface 9, a portion of the light is diffused by the irregularities of the surface 9 while a portion of the light is reflected in a specular beam together with a reflected field. As noted previously, the position sensing devices 21 and 21' in accordance with the present invention sense the position of the diffused light from the surface 9 which is focused on the position sensing devices 21 and 21' and provide a position signal to the processor 3 indicative of the position of the diffused light. In addition, in the preferred embodiment, the position sensing devices 21 and 21' also provide a diffused light intensity signal to the processor 3 which is indicative of the intensity of the diffused light. The photodiodes 19 and 19' sense the intensity of the reflected light reflected by the surface 9 and provide a reflected light intensity signal to the processor 3 indicative of the intensity of the reflected light. As previously noted, in the illustrated embodiment, the photodiodes 19 and 19' sense the intensity of the reflected field rather than the specular beam. These signals are used by the processor 3 such as the central processing unit in the present embodiment, to provide accurate measurements with respect to surface characteristics such as surface roughness, waviness and form error.

Figure 4:
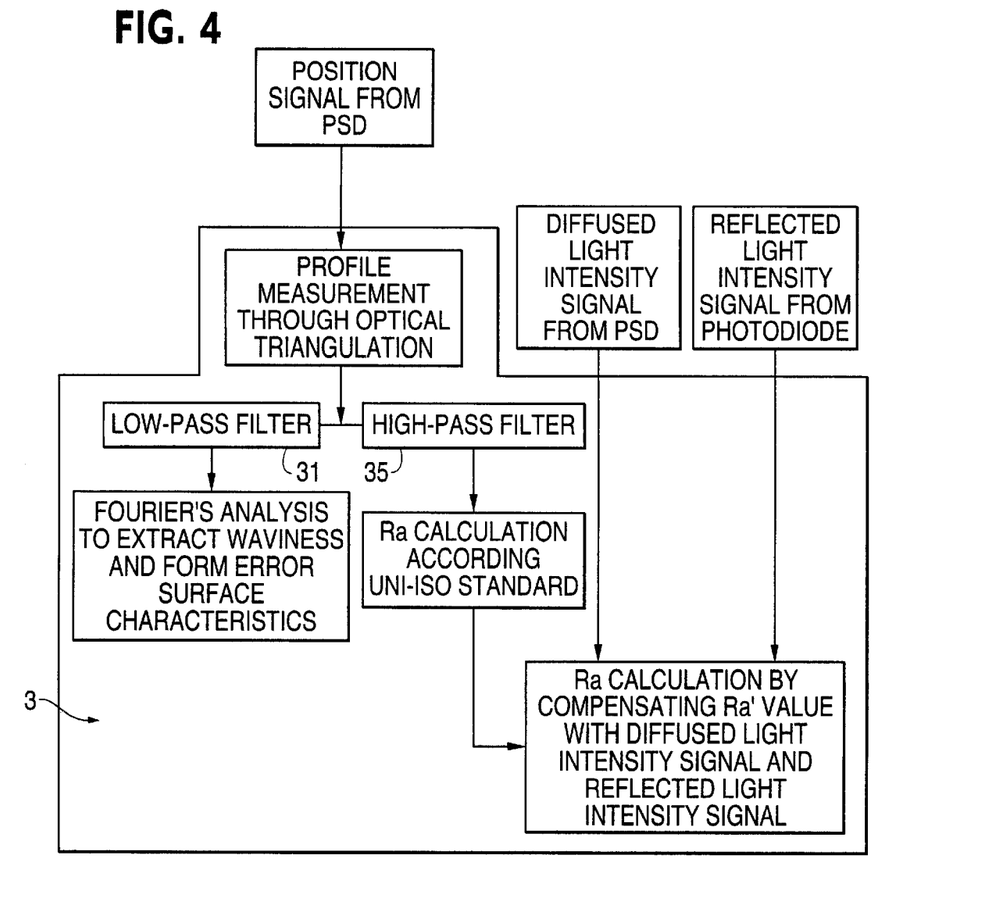
FIG. 4 is a schematic illustration of the method used by the processor for determining the Ra value in accordance with the present invention.

The manner in which these signals are processed in the processor 3 is illustrated in FIG. 4. As can be seen, the position signal provided by one or more of the position sensing devices 21 and 21' is processed in the processor 3 to derive a profile measurement of the surface 9 utilizing the triangulation method described previously in the Background. More specifically, the position sensing devices 21 and 21' are PIN diodes that provide two current outputs in the present embodiment. The ratio between the output currents is determined by the position of the diffused light focused on the position sensing devices 21 and 21' and is provided as the position signal to the processor 3. When the focused laser beam is over a peak or a valley on the surface 9, the position of the diffused light focused on the PIN diode changes thereby changing the ratio between the output currents and correspondingly, changing the position signal provided to the processor 3. Because the deflection of the diffused light is geometrically correlated to the shape and size of the peak or valley on the surface 9, the change in the position signal can then easily be translated into a distance measurement of the peak or valley by the processor 3. Thus, in this manner, a profile measurement of the surface 9 may be obtained through this conventional triangulation method. Of course, the detailed operations of triangulation systems in general are already known in the art and may also be derived easily from the above disclosed information and need not be discussed in further detail here.

As can be seen in FIG. 4, this profile measurement obtained through the triangulation method described above is provided to both a low pass filter 31 and a high pass filter 35 in the processor 3. The signal from the low pass filter 31 is then analyzed by the processor 3 using Fourier's analysis to extract out the waviness and form error characteristics of the surface 9. Of course, the method of Fourier analysis which allows the separation of periodic functions is well known in mathematics and other arts such as in computer programming and electrical engineering arts and need not be further detailed here. Thus, in the present invention, the processor 3 applies Fourier's analysis to the signal from the low pass filter 31 in order to extract the periodic characteristics of the signal that correspond to the waviness and form error characteristics of the surface 9. In this manner, unlike the prior art surface roughness measurement systems, the present surface characteristic measurement system 1 is able to accurately measure waviness and form error characteristics of the surface 9. Furthermore, as will be discussed hereinbelow, the surface characteristic measurement system 1 in accordance with the present invention also provides more accurate measurement of the surface roughness of surface 9 in contrast to prior art measurement systems.

The profile measurement computed from the position signal provided by the position sensing devices 21 and 21' is also filtered through the high pass filter 35 and is used by the processor 3 to calculate a Ra' value in accordance with the UNI-ISO standard. More specifically, the profile measurement which is comprised of i height measurements are used to calculated the arithmetic average roughness height using the well known formula:

$$Ra' = (1/N)\Sigma|y_i|$$

where

Ra'=arithmetic average roughness height (prime symbol being used only to differentiate this Ra value from a compensated Ra value discussed in detail below)

N=number of lateral positions at which vertical dimension is measured $|y_i|$=absolute value of a vertical dimension from the mean line for each lateral position i.

The prior art triangulation surface measurement systems essentially provided this Ra' value which was calculated utilizing the triangulation method described previously as the surface roughness measurement. In contrast, the surface characteristic measurement system 1 of the present invention further processes this Ra' value to obtain a more accurate value of surface roughness. More specifically, once this Ra' value is measured, it is then processed together with the reflected light intensity signal from the photodiodes 19 and 19' and the diffused light intensity signal from the position sensing devices 21 and 21' to derive a calculated Ra value which accurately measures the surface roughness of surface 9. In the present embodiment, the diffused light intensity signal may be determined through the summation of the two output currents from the position sensing devices 21 and 21'. Thus, three separate signals may be used in accordance with the present invention to determine the surface roughness characteristic of surface 9. In this regard, the Ra value may be obtained in the present embodiment by compensating the calculated Ra' value with the diffused light intensity and the reflected light intensity by using the equation:

$$Ra=Ra' \times k(I_d/I_r)$$

where

Ra=calculated arithmetic average roughness height

Ra'=arithmetic average roughness height (from the position signal using the triangulation method), $I_d$=average intensity of the diffused light as measured by the position sensing device(s), $I_r$=average intensity of the reflected light as measured by the photodiode(s), and k=normalizing function.

As can be seen, the normalizing function k for the ratio of $I_d$ and $I_r$ results in a corresponding numeric constant by which Ra' may be multiplied to derive the Ra value. This k function is generally provided by the sensor manufacturer or may be obtained in the normal manner as used in the measurement technology industry. More specifically, the k function is highly dependent on the design and the components used in each sensor and thus, is generally experimentally determined by measuring multiple surfaces with known characteristics (i.e. known Ra) and performing mathematical regression analysis to derive a polynomial equation which best describe the normalizing function k. It should also be noted that the above noted process and calculations may be implemented in software contained in (or is accessible to) the processor 3. Such implementations are well known in the computer arts and need not be detailed here.

Thus, in the above described manner, the surface characteristic monitoring system 1 in accordance with the present invention, effectively and accurately measures various surface characteristics including surface roughness, waviness, and form error. More specifically, the surface characteristic measure system 1 utilizes the position signal from the position sensing device to determine waviness and form error of the surface using Fourier's analysis. In addition, the present system also effectively augments the triangulation calculation methods with the reflected light intensity signal and the diffuse light intensity signal to enhance the measurement range and the measurement accuracy beyond that which is possible with conventional triangulation or light scattering systems. These surface roughness, waviness, and form error values may then be used for their intended purposes. For example, these surface characteristics may be used by the processor 3 for further processing in statistical quality control methods, placed in to memory, be provided to the user, or be automated to further control various machines that manufacture the surface being measured thereby forming a feed-back loop. Of course, the above noted uses are examples only and the use of the surface characteristics depends on the application and the objectives for which the surface characteristic measurement system 1 is intended to serve.

Figure 5:
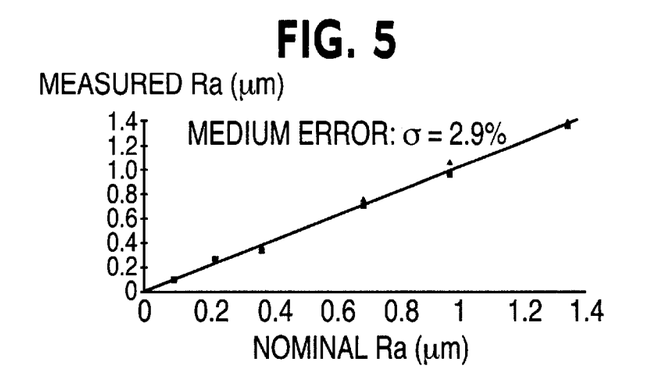
FIG. 5 is data obtained while testing the accuracy of the surface characteristics measurement system in accordance with the present invention.

FIG. 5 illustrates the improved roughness measurement accuracy and measurement range of the surface characteristics measurement system 1 in accordance with the present invention as described above. The graph of FIG. 5 shows the deviation between the Ra value measured by the surface characteristics measurement system 1 (y-axis) and the nominal Ra value of various sample surfaces with known surface characteristics (x-axis). Ra values ranging between 0.1 to 1.4 $\mu$m were used in the testing because as noted previously, the prior art measurement systems are highly inaccurate in this particular range of Ra values. In these tests, a medium error of only 2.9% has been found which indicates that a high level of accuracy is attained through the present surface characteristics measurement system 1 and method.

Figure 6:
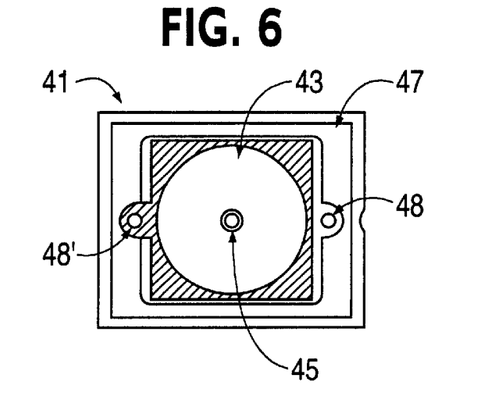
FIG. 6 is a frontal view of an alternative embodiment of a photodiode in accordance with the present invention.
Figure 7:
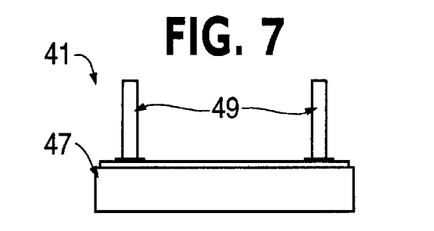
FIG. 7 is a side profile view of the photodiode of FIG. 6.
Figure 8:
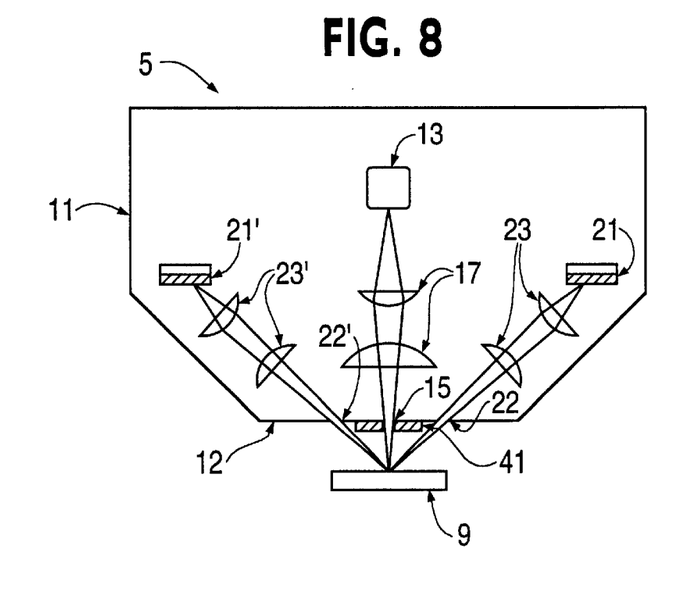
FIG. 8 is a cross-sectional view of a surface measurement sensor in accordance with an alternative embodiment of the present invention using the photodiode of FIGS. 6 and 7.
Figure 9:
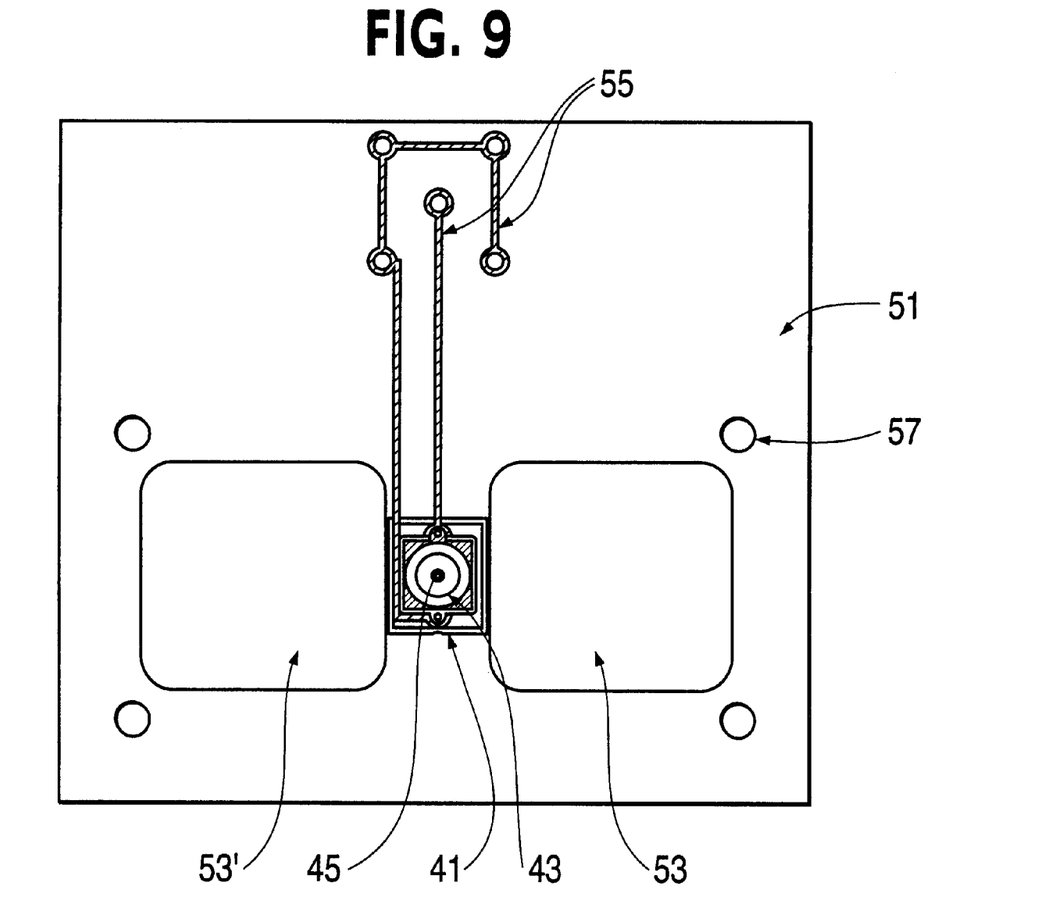
FIG. 9 is a frontal view of an alternative embodiment of a photodiode of FIG. 6 mounted on a printed circuit type board.

In an alternative embodiment of the surface measurement sensor 5, a single photodiode may be used as illustrated in FIG. 6. In this embodiment, a photodiode 41 having a circular sensing area 43 may be used to detect the intensity of light in the reflected field. The photodiode 41 may include a mounting body 47 which allows it to be positioned in the same general area of the surface measurement sensor 5 as the photodiodes 19 and 19' of the previously described embodiment. In this regard, the photodiode 41 may include mounting rods 49 illustrated in FIG. 7 which allows the photodiode 41 to be mounted in the housing 11 in the manner illustrated in FIG. 8. In addition, the photodiode 41 may also be provided with a circular opening 45 as shown in FIGS. 6 and 9 at substantially the center of the circular sensing area 43 so that the light beam from the light source 13 may pass through the photodiode 41 and illuminate the surface 9. Furthermore, the photodiode 41 may include electrical contacts 48 and 48' to provide the corresponding reflected light intensity signal to the processor 3. This alternative embodiment of the photodiode 41 would operate in the same manner as the previously described embodiment to provide a surface characteristic monitoring system 1 that effectively and accurately measures various surface characteristics including surface roughness, waviness, and form error. In this regard, photodiode from Centronic® has been found to be an effective photodiode 41 which can be used to sense the intensity of the light in the reflected field and to provide the corresponding reflected light intensity signal to the processor 3. Because of the circular sensing area 43, the photodiode 41 has been found to provide improved accuracy in the measurement of the surface characteristics and reduces susceptibility to misalignment errors since the more of the reflected light can be sensed. To avoid repetition however, the detailed discussion of the operation of this embodiment is not repeated here but reference is made to the prior discussion of the prior embodiment since both embodiments operates in substantially the same manner.

In yet still another alternative embodiment as illustrated in FIG. 9, the photodiode 41 may be mounted on a board 51 which can be mounted on the front face 12 of the housing 11 using mounting holes 57. In this regard, the board 51 may include openings 53 and 53' to allow the diffused light from the surface 9 to enter the surface measurement sensor 5 and illuminate upon the position sensing devices 21 and 21'. Electrical leads 55 which connect to the electrical contacts 48 and 48' of the photodiode 41 may also be provided. In the illustrated embodiment, the electrical leads 55 may be integrally provided on the board 51 by using a conventional printed circuit type board such as those made of ceramic or other non-conductive materials. Of course, the use of the board 51 is not required and is merely illustrated as an alternative embodiment which may facilitate modification of the LTS model sensor manufactured by Dynavision® discussed previously for use in accordance with the present invention.

It should also be understood that position sensing devices and photodiodes from different manufacturers as well as of different shapes may also be used. For instance, in yet another alternative embodiment, a photodiode with a substantially hemispherical shape (not shown) may also be used. In such an embodiment, the position sensing device would also have an opening at the apex of the hemisphere to allow the light beam from the light source to illuminate the surface being measured.

From the foregoing, it should now be apparent how the present invention provides an improved surface characteristic monitoring system 1 that effectively and accurately measures various surface characteristics including surface roughness, waviness, and form error. Furthermore, it can be seen how the present invention affords such a system which augments triangulation calculation methods with the reflected light intensity signal and the diffused light intensity signal to enhance the measurement range and the measurement accuracy beyond that which is possible with conventional triangulation or light scattering systems.

While various embodiments in accordance with the present invention have been shown and described, it is understood that the invention is not limited thereto. The present invention may be changed, modified and further applied by those skilled in the art. For instance, it should be recognized that the relative positioning of the various components illustrated in FIGS. 2, 3 and 8 are provided as an example only and the present invention may be practiced with the various components configured in a different manner. For instance, it should be apparent to the skilled in the art that other optical components such as additional lenses, optical mirrors and/or optical fibers may be used to provide the light source 13, the position sensing devices 21 and 21', and the photodiodes 19 and 19' or 41 in various other positions not illustrated in the figures. Furthermore, it should also be recognized by one skilled in the art that the present invention can be practiced using various numbers of position sensing devices and photodiodes. It should further be recognized that a photodiode may be positioned to sense the intensity of the specular beam. Therefore, this invention is not limited to the detail shown and described previously, but also includes all such changes and modifications which are encompassed by the claims.

INDUSTRIAL APPLICABILITY

The present invention will find applicability in wide range of manufacturing and processing industries where surface characteristic measurements are required.

What is claimed is:

1. A surface characteristic measurement system for measuring a characteristic of a surface comprising:
    a processor;
    a light source adapted to provide a light beam on said surface in a manner that said light beam is diffused and reflected by said surface into a diffused light and a reflected light;
    a position sensing device adapted to sense a position and an intensity of said diffused light diffused by said surface, and to provide a position signal and a diffused light intensity signal to said processor indicative of said position and said intensity of said diffused light respectively; and
    a photodiode adapted to sense intensity of said reflected light reflected by said surface and to provide a reflected light intensity signal to said processor indicative of reflected light intensity;
    wherein said processor is adapted to determine said surface characteristic based on said position signal and said diffused light intensity signal received from said position sensing device, and said reflected light intensity signal received from said photodiode.

2. A system of claim 1, wherein said light beam is provided substantially perpendicular to said surface.

3. A system of claim 1, further comprising a second photodiode.

4. A system of claim 1, wherein said position sensing device is a PIN diode.

5. A system of claim 4, further comprising a second position sensing device wherein each of said position sensing devices are positioned to sense diffused light diffused at a substantially 45 degree angle from a specular light beam.

6. A system of claim 1, wherein said photodiode includes a circular sensing area with a central opening positioned to allow passage of a light beam from said light source.

7. A system of claim 1, wherein said photodiode has a hemi-spherical shape with a central opening positioned to allow passage of a light beam from said light source.

8. A method for measuring a surface characteristic of a surface comprising the steps of:
    positioning a non-contact, surface measurement sensor at a predetermined distance from said surface;
    projecting a light beam on to said surface in a manner that said light beam is diffused and reflected by said surface into a diffused light and a reflected light;
    measuring a position and an intensity of said diffused light diffused by said surface and providing a position signal and a diffused light intensity signal indicative of the position and intensity of said diffused light respectively;
    measuring an intensity of said reflected light reflected by said surface and providing a reflected light intensity signal indicative of the intensity of said reflected light; and
    determining said surface characteristic based on said position signal, said diffused light intensity signal, and said reflected light intensity signal.

9. A method of claim 8, further comprising the step of:
    determining a profile measurement through triangulation of said position signal.

10. A method of claim 9, further comprising the steps of:
    providing said profile measurement to a low-pass filter, and
    performing Fourier's analysis on said profile measurement to determine at least one of a waviness value indicative of the waviness of said surface and a form error value indicative of the form error of said surface.

11. A method of claim 10, wherein said Fourier's analysis is performed on said profile measurement to determine a waviness value indicative of the waviness of said surface and a form error value indicative of the form error of said surface.

12. A method of claim 9, further comprising the steps of:
providing said profile measurement to a high-pass filter, and
calculating an Ra' value indicative of measured surface roughness of said surface.

13. A method of claim 12, further comprising the step of:
calculating an Ra value indicative of the calculated surface roughness of said surface by compensating said Ra' value with at least one of said reflected light intensity signal and said diffused light intensity signal.

14. A method of claim 13, wherein said Ra value is calculated by compensating said Ra' value with said reflected light intensity signal and said diffused light intensity signal.

15. A method of claim 14, wherein said Ra value is calculated using a mathematical relation comprising:

$$Ra=Ra' \times k(I_d/I_r)$$

where
- Ra'=measured roughness value computed from the position signal using a triangulation method,
- $I_d$=average intensity of said diffused light as measured by said position sensing device,
- $I_r$=average intensity of said reflected light as measured by said photodiode, and
- k=normalizing function in which the ratio of $I_d$ and $I_r$ results in a corresponding numeric constant by which Ra' may be multiplied to derive the Ra value.

16. A method of claim 8, further comprising the step of:
determining a profile measurement through triangulation of said position signal.

17. A method of claim 16, further comprising the steps of:
providing said profile measurement to a low-pass filter, and
performing Fourier's analysis on said profile measurement to determine at least one of a waviness value indicative of the waviness of said surface and a form error value indicative of the form error of said surface.

18. A method of claim 17, further comprising the steps of:
providing said profile measurement to a high-pass filter, and
calculating an Ra' value indicative of measured surface roughness of said surface.

19. A surface characteristic measurement system comprising:
a processor means for measuring a surface characteristic of said surface;
a light source means for providing a light beam on said surface in a manner that said light beam is diffused and reflected by said surface into a diffused light and a reflected light, said light beam being substantially perpendicular to said surface;
a position sensing means for detecting a position and an intensity of said diffused light diffused by said surface and providing a position signal and a diffused light intensity signal to said processor means indicative of position and intensity of said diffused light respectively; and
a photodiode means for sensing said reflected light reflected off said surface and providing a reflected light intensity signal to said processor means indicative of reflected light intensity;
wherein said processor determines said surface characteristic based on said position signal and said diffused light intensity signal received from said position sensing means, and said reflected light intensity signal received from said photodiode means.

20. A system of claim 19, wherein said processor means comprises a microcomputer.

21. A system of claim 19, wherein said position sensing means comprises a PIN diode.

22. A system of claim 19, wherein said photodiode means includes a circular sensing area with a centrally positioned opening for allowing passage of a light beam from said light source means.

23. A system of claim 19, wherein said photodiode means has a hemi-spherical shape with a centrally positioned opening for allowing passage of a light beam from said light source means.

24. A system of claim 19, wherein said processor means determines a profile measurement by analyzing said position signal through triangulation method.

25. A system of claim 24, wherein said processor means further provides said profile measurement to a low-pass filter, and performs Fourier's analysis on said profile measurement to determine at least one of a waviness value indicative of the waviness of said surface and a form error value indicative of the form error of said surface.

26. A system of claim 25, wherein said processor means performs Fourier's analysis on said profile measurement to determine a waviness value indicative of the waviness of said surface and a form error value indicative of the form error of said surface.

27. A system of claim 24, wherein said processor means further provides said profile measurement to a high-pass filter, and calculates an Ra' value indicative of measured surface roughness of said surface.

28. A system of claim 27, wherein said processor means further calculates an Ra value indicative of the calculated surface roughness of said surface by compensating said Ra' value with at least one of said reflected light intensity signal and said diffused light intensity signal.

29. A system of claim 28, wherein said processor means calculates said Ra value by compensating said Ra' value with said reflected light intensity signal and said diffused light intensity signal.

30. A system of claim 29, wherein said processor means calculates said Ra value by using a mathematical relation comprising:

$$Ra=Ra' \times k(I_d/I_r)$$

where
- Ra'=measured roughness value computed from the position signal using a triangulation method,
- $I_d$=average intensity of said diffused light as measured by said position sensing device,
- $I_r$=average intensity of said reflected light as measured by said photodiode, and
- k=normalizing function in which the ratio of $I_d$ and $I_r$ results in a corresponding numeric constant by which Ra' may be multiplied to derive the Ra value.

31. A system of claim 30, wherein said processor means further provides said profile measurement to a low-pass filter, and performs Fourier's analysis on said profile measurement to determine at least one of a waviness value indicative of the waviness of said surface and a form error value indicative of the form error of said surface.

32. A system of claim 31, wherein said processor means performs Fourier's analysis on said profile measurement to determine a waviness value indicative of the waviness of said surface and a form error value indicative of the form error of said surface.

33. A surface characteristic measurement system for measuring a characteristic of a surface comprising:

a processor;

a light source adapted to provide a light beam on said surface in a manner that said light beam is diffused and reflected by said surface into a diffused light and a reflected light;

a position sensing device adapted to sense a position of said diffused light diffused by said surface and to provide a position signal to said processor indicative of said position of said diffused light; and a photodiode adapted to sense intensity of said reflected light reflected by said surface and to provide a reflected light intensity signal to said processor indicative of reflected light intensity;

wherein said processor is adapted to determine said surface characteristic based on at least said position signal received from said position sensing device and said reflected light intensity signal received from said photodiode.

34. A system of claim 33, wherein said position sensing device is a PIN diode and further comprising a second position sensing device wherein each of said position sensing devices are positioned to sense diffused light diffused at a substantially 45 degree angle from a specular light beam.

35. A system of claim 33, wherein said photodiode includes a circular sensing area with a central opening positioned to allow passage of a light beam from said light source.

36. A method for measuring a surface characteristic of a surface comprising the steps of:

positioning a non-contact, surface measurement sensor at a predetermined distance from said surface;

projecting a light beam on to said surface in a manner that said light beam is diffused and reflected by said surface into a diffused light and a reflected light;

measuring a position of said diffused light diffused by said surface and providing a position signal indicative of the position of said diffused light;

measuring an intensity of said reflected light reflected by said surface and providing a reflected light intensity signal indicative of the intensity of said reflected light; and determining said surface characteristic based on at least said position signal and said reflected light intensity signal.

37. A method of claim 36, further comprising the steps of:

determining a profile measurement through triangulation of said position signal;

providing said profile measurement to a low-pass filter; and performing Fourier's analysis on said profile measurement to determine at least one of a waviness value indicative of the waviness of said surface and a form error value indicative of the form error of said surface.

38. A surface characteristic measurement system comprising:

a processor means for measuring a surface characteristic of said surface;

a light source means for providing a light beam on said surface in a manner that said light beam is diffused and reflected by said surface into a diffused light and a reflected light, said light beam being substantially perpendicular to said surface;

a position sensing means for detecting a position of a diffused light diffused by said surface and providing a position signal to said processor means indicative of position of said diffused light; and a photodiode means for sensing reflected light reflected off said surface and providing a reflected light intensity signal to said processor means indicative of reflected light intensity;

wherein said processor determines said surface characteristic based on at least one of said position signal received from said position sensing means and said reflected light intensity signal received from said photodiode means.

39. A system of claim 38, wherein said position sensing means comprises a PIN diode.

40. A system of claim 38, wherein said photodiode means includes a circular sensing area with a centrally positioned opening for allowing passage of a light beam from said light source means.

41. A system of claim 38, wherein said photodiode means has a hemi-spherical shape with a centrally positioned opening for allowing passage of a light beam from said light source means.

* * * * *